United States Patent Office 3,524,090
Patented Aug. 11, 1970

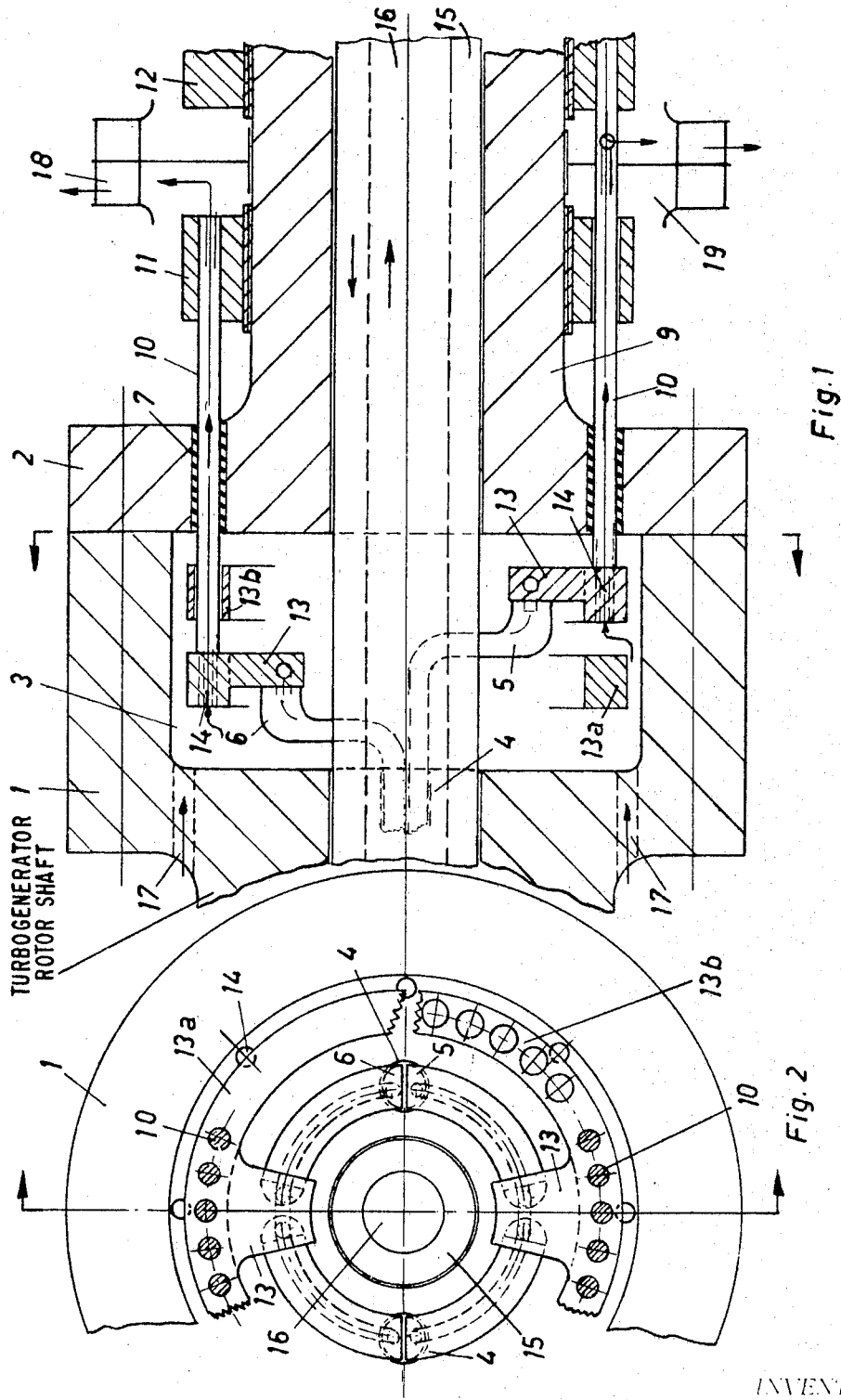

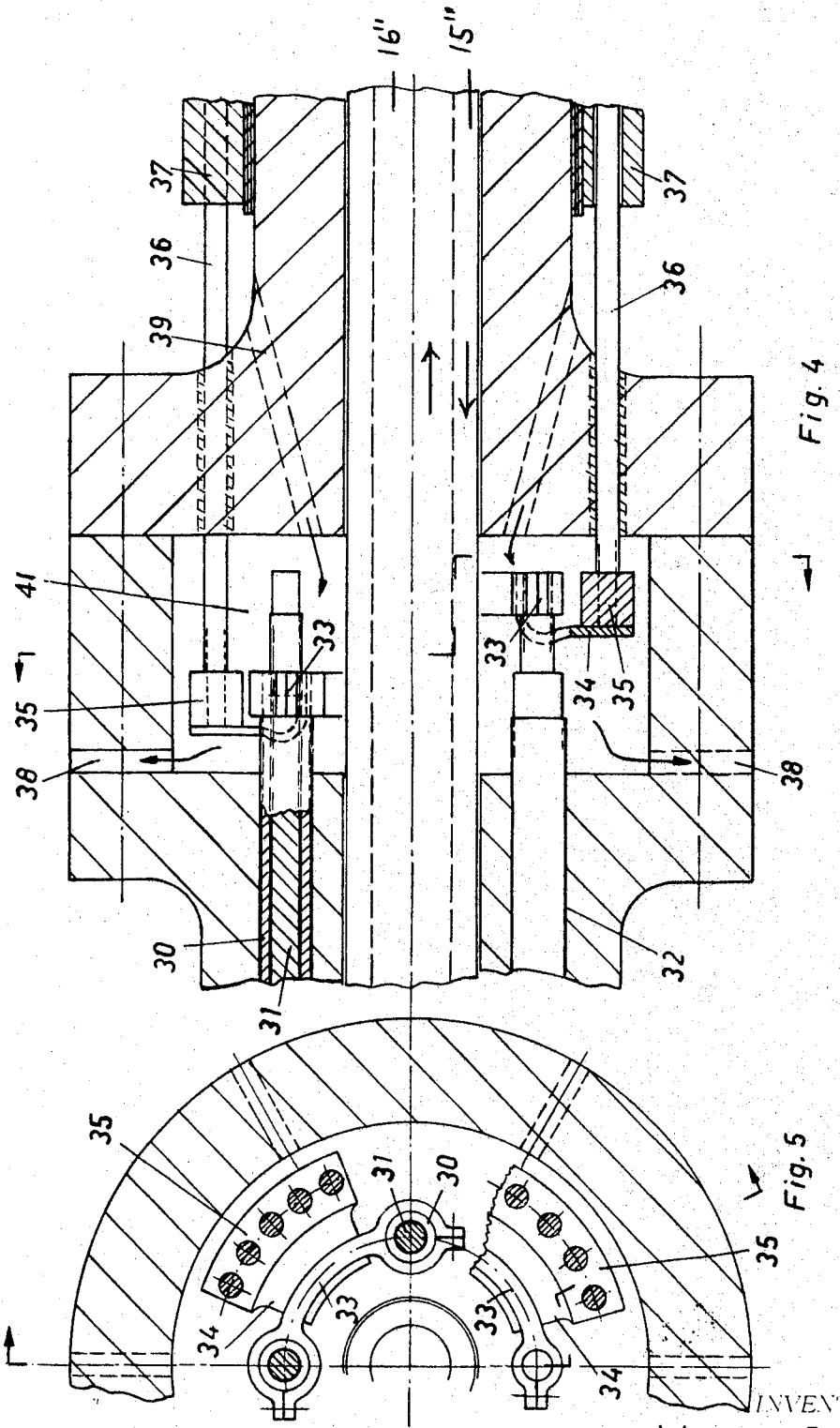

3,524,090
SHAFT COUPLINGS FOR MECHANICALLY AND ELECTRICALLY CONNECTING THE ROTOR SHAFT OF A TURBOGENERATOR WITH A SEPARATE SHAFT
Werner Sark, Birr, Switzerland, assignor to Aktiengesellschaft Brown, Boveri & Cie, Baden, Switzerland, a joint-stock company
Filed Nov. 16, 1967, Ser. No. 683,659
Claims priority, application Switzerland, Dec. 7, 1966, 17,459/66
Int. Cl. H02k 11/00
U.S. Cl. 310—71
7 Claims

ABSTRACT OF THE DISCLOSURE

A shaft coupling for forming the necessary mechanical and electrical connections between the shaft of a liquid-cooled rotor element of a turbogenerator and a separate shaft carrying the electrical supply components such as, for example, slip rings, diodes, unipolar machine etc., for the rotor winding features location of the electrical leads from the supply component and the electrical leads to the rotor winding outside of the center bore of the coupled shafts which is used to convey liquid coolant to and from the rotor winding, the leads correlated to the supply component being located exteriorly of the associated shaft.

In turbogenerators it is known to arrange the electrical supply components such as, for example, sliprings, diodes, unipolar machine, for the exciter winding of the generator on a separate shaft which is mechanically coupled with the rotor shaft by means of a shaft coupling. This shaft coupling also contains the contact arrangement for forming the electrical connections between the leads for the exciter winding and the supply.

In hitherto known shaft couplings, the connecting leads between current supplies and generator winding are mounted in the center bores of both shafts. The connections between these leads and the supply devices and exciter winding are made by way of radial lead pins, necessitating several contacts. However, in the case of a turbogenerator with liquid-cooled rotor, the channels for introducing and removing the coolant are located in the center bore of the rotor shaft. The additional mounting of the exciter leads meets substantial difficulties with regard to the insulation at the right-angled deflection from the axial to the radial direction. On the other hand, however, eccentric bores relative to the shaft axis are undesirable, because the shaft diameter must be kept small with sliprings or other supply devices.

The present invention has for its primary object a a shaft coupling for forming the mechanical and electrical connections between the shaft of a liquid cooled rotor element of a turbogenerator and a separate shaft, carrying the electrical supply components for the exciter winding on the rotor, in which the above mentioned drawbacks of this kind of shaft coupling are avoided. According to the invention, this objective is realized in that the electrical leads for both the supply component and the exciter winding are located outside the center bore of the coupled shafts, and wherein the leads correlated to the supply component are located outside the associated shaft.

The invention will be further described, by way of example, with reference to the accompanying drawing, in which:

FIGS. 1 and 2 show a shaft coupling for a liquid-cooled generator in axial and transverse cross-section, respectively;

FIGS. 4 and 5 show yet another embodiment of the invention in axial and transverse cross-section, respectively.

Figure 3:
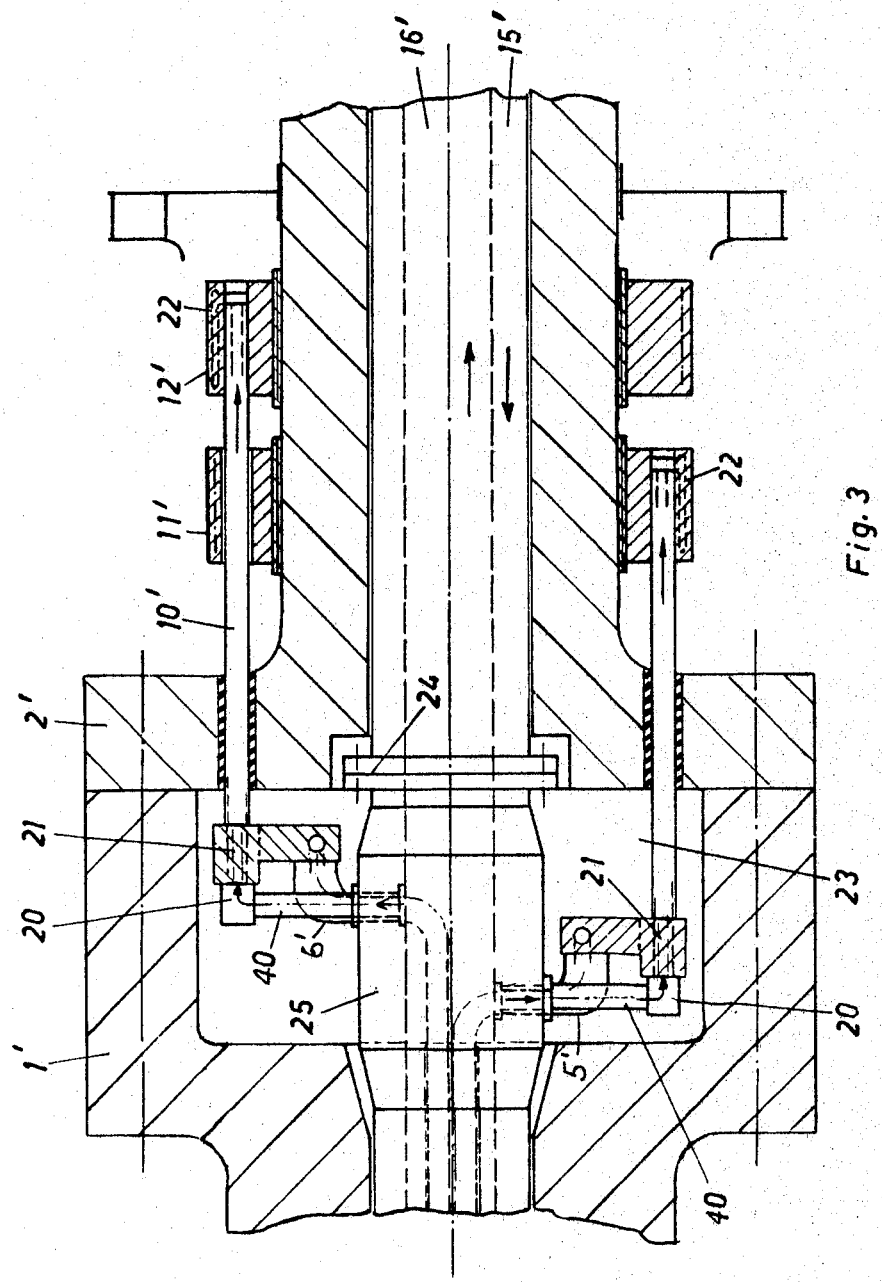
FIG. 3 shows a longitudinal cross-section of another embodiment.

FIGS. 1 and 2 represent, in axial and transverse cross-section, a shaft coupling for a liquid-cooled turbogenerator rotor shaft. The shaft coupling consists of two flanges 1, 2, interconnected by machine bolts, as known per se. In a recessed bore 3 of the generator-side coupling flange 1, the electrical connection is made between the electric leads 5, 6 to the generator exciter winding (not shown) and located in the bores 4 of the rotor shaft, and the leads 10 from the sliprings 11, 12 mounted on the shaft 9 and passing through electrically insulated axial bores 7 in the slipring flange 2. The connection of the leads 5 or 6 with the leads 10 is effected through connectors 13 and contact rings 13a and 13b, respectively. The leads from the slip rings extending outside the shaft 9, are connected by plug-in contacts 14 with the rings 13a and 13b, and the number of leads 10 is independent of the number of leads 5, 6. Reference numerals 15, 16 signify the concentric channels for supplying and removing the liquid for cooling the exciter winding on the rotor.

The arrangement of FIGS. 1 and 2 has the substantial advantage of making possible a thorough cooling of the leads 10 to the sliprings 11, 12, if the same are constructed as hollow tubes. In this case, the generator-side coupling flange 1 is provided with bores 17, through which air is drawn in by means of a radial fan 18 mounted on the slipring shaft 9 and conducted through the hollow tubes 10 into the intake chamber 19 of the fan, removing at the same time also, a certain amount of heat from the sliprings. This air, flowing into the coupling chamber 3 through the bores 17 causes also the cooling of the electrical contact points within the coupling. The leads 5, 6 to the exciter winding on the rotor are also constructed as hollow tubes and are connected to the liquid cooling system (that is to say, the channels 15, 16) of the exciter winding, as known in the art.

It is also possible to cool the sliprings 11, 12 with water or another liquid, wherein the water necessary for cooling is taken within the coupling from the channels 15, 16, provided in the shaft, for conveying liquid coolant to and from the exciter winding of the generator and the heated water is again supplied thereinto. Such an arrangement is shown in axial cross-section of FIG. 3, in which the parts corresponding to those already shown in FIGS. 1 and 2 are designated by the same reference numerals but with primes added for purposes of distinction.

The leads 10' for the sliprings 11', 12' having the form of electrically conductive hollow tubes, communicate through radial tubular insulating members 40 with the axial cooling water channels 15', 16' in the shaft bore. The outer ends of the insulating members 40 each terminate in a connector 20, and preferably water-cooled plugs 21 through which the tubes 10' pass are used for connecting the hollow conductors 10' with this connector 20. The leads 10' serve here to also conduct the cooling water, taken from the channel 15', to the sliprings 11', 12', and for returning the heated water to the channel 16', and for producing at the same time a very effective cooling of the sliprings in addition to supplying current to the rotor winding connections 5', 6'. Within the sliprings 11', 12' there are connecting conduits 22, necessary for circulating the cooling water and returning it to channel 16' via another set of hollow tube leads 10' and tubes 40 which are circumferentially spaced from the illustrated leads and hence are not visible in FIG. 3. The free space 23 inside the coupling makes it possible, by means of a tube coupling 24, to maintain the cross-section of the axial channels 15', 16' at the radial connections, by widening the tube 25 surrounding the channels, and to avoid in this way an excessively high flow velocity of the cooling water.

FIGS. 4 and 5 show a further embodiment of the invention in axial and transverse cross-section, respectively, in which the direct cooling of the sliprings has been abandoned and the installation correspondingly simplified.

Here, the generator-side leads are shown to be coaxial conductors 30, 31 mounted in bores 32 which are eccentric to the shaft axis. The conductors with the same polarity are interconnected by terminals 33 which are electrically connected by flexible clips 34 with contact rings or contact segments 35. The leads 36 for the sliprings 37 are electrically connected by plugs or similar connecting elements with the contact segments 35. Air enters the space coupling 41 through oblique bores 39, flows through the radial bores 38 and cools the contact points in the coupling. The type of electrical connection within the coupling, i.e. the flexible clips 34, guarantee the sufficient thermal expansion of the leads which is much greater than with directly cooled leads. The air cooling inside the contact chamber 41 in the coupling is sufficient to prevent excessively high temperatures at the contact points.

I claim:

1. A shaft coupling mechanically and electrically connecting the rotor shaft of a turbogenerator with a separate shaft axially aligned therewith and which mounts electrical supply components for a rotor winding supplied with liquid coolant through axial bores in said shafts, said coupling including flanges located respectively on said shafts and which are connected together, said flange on said rotor shaft including a chamber portion, electrical leads to said rotor winding located outside of said axial bores in said rotor shaft, and electrical leads from said supply components extending longitudinally along and located exteriorly of said separate shaft, said electrical leads to said rotor winding and said electrical leads from siad supply components being terminated and electrically interconnected within said chamber portion provided within said flange on said rotor shaft.

2. A shaft coupling as defined in claim 1 wherein said electrical leads from said supply components are constituted by tubular members and which further includes means for conducting air through said tubular members, said cooling air being drawn into the tubular members within said chamber portion through bores provided in said coupling and which extend from the chamber portion to the exterior of said coupling.

3. A shaft coupling as defined in claim 2 and which further includes a fan arranged on said separate shaft, the intake of said fan being correlated to the ends of said tubular members opposite the ends which terminate within said chamber portion for drawing air through said tubular members.

4. A shaft coupling as defined in claim 1 wherein said electrical leads to said rotor winding and said electrical leads from said supply components are constituted by hollow conductors through which said liquid coolant is circulated in a common system, and said electrical leads from said supply components communicate through radial insulating members with said axial bores in said shaft in which the said liquid coolant passes.

5. A shaft coupling as defined in claim 1 wherein said electrical leads from the supply components are connected to said electrical leads to the rotor winding by means including flexible clips and plugs located within said chamber portion, and which further includes means for cooling said connecting means by air passed into and out of said chamber portion by means of bores in the chamber wall extending obliquely and radially respectively in relation to the shaft axis.

6. A shaft coupling as defined in claim 1 wherein for each polarity of the circuit connections the number of electrical leads from said supply components is greater than the number of electrical leads to the rotor winding.

7. A shaft coupling as defined in claim 1 wherein said electrical leads from the supply components and said electrical leads to the rotor winding lie on different pitch circles within said chamber portion.

References Cited

UNITED STATES PATENTS

| 1,277,783 | 9/1918 | Uggla | 310—227 |
| 2,722,652 | 11/1955 | Brainard | 310—68.4 |
| 2,897,383 | 7/1959 | Barrows et al. | 310—68 |
| 2,950,403 | 8/1960 | Kilner et al. | 310—227 X |
| 3,030,531 | 4/1962 | Lessmann | 310—68 |
| 3,145,314 | 8/1964 | Becker | 310—68 |
| 3,191,082 | 6/1965 | Csillag | 310—227 X |
| 3,363,122 | 1/1968 | Hoover et al. | 310—68 |
| 3,371,235 | 2/1968 | Hoover | 310—68 |
| 3,359,438 | 12/1967 | Hylen | 310—68 |

MILTON O. HIRSHFIELD, Primary Examiner

M. BUDD, Assistant Examiner

U.S. Cl. X.R.

310—58